United States Patent
Lang et al.

(10) Patent No.: US 11,292,168 B2
(45) Date of Patent: Apr. 5, 2022

(54) PROCESS AND APPARATUS FOR THE MANUFACTURING OF A FIGURE-OF-EIGHT CABLE

(71) Applicant: Prysmian S.p.A., Milan (IT)

(72) Inventors: Ian Dewi Lang, Milan (IT); Paul John Roberts, Milan (IT)

(73) Assignee: PRYSMIAN S.P.A., Milan (IT)

( * ) Notice: Subject to any disclaimer, the term of this patent is extended or adjusted under 35 U.S.C. 154(b) by 449 days.

(21) Appl. No.: 16/331,616

(22) PCT Filed: Sep. 14, 2016

(86) PCT No.: PCT/EP2016/071671
§ 371 (c)(1),
(2) Date: Mar. 8, 2019

(87) PCT Pub. No.: WO2018/050220
PCT Pub. Date: Mar. 22, 2018

(65) Prior Publication Data
US 2019/0193320 A1  Jun. 27, 2019

(51) Int. Cl.
*B29C 48/92* (2019.01)
*B29C 48/156* (2019.01)
(Continued)

(52) U.S. Cl.
CPC .......... *B29C 48/0019* (2019.02); *B29C 48/05* (2019.02); *B29C 48/154* (2019.02);
(Continued)

(58) Field of Classification Search
CPC . B29C 48/0013; B29C 48/0019; B29C 48/05; B29C 48/19; B29C 48/154;
(Continued)

(56) References Cited

U.S. PATENT DOCUMENTS 2,204,782 A * 6/1940 Wermine .............. B29C 48/156
156/55
3,296,659 A * 1/1967 Okazaki .................. B29C 48/06
425/112
(Continued)

FOREIGN PATENT DOCUMENTS

DE   2707197 A1   8/1978
FR   2381379 A1   9/1978
(Continued)

OTHER PUBLICATIONS

Machine translation of FR 2393503 published Dec. 29, 1978. (Year: 1978).*
(Continued)

*Primary Examiner* — Xiao S Zhao
*Assistant Examiner* — Joseph S Leyson
(74) *Attorney, Agent, or Firm* — Shumaker, Loop & Kendrick, LLP (57) ABSTRACT

It is disclosed a process and an apparatus for manufacturing a figure of eight cable. An extrusion head has separate extrusion dies extruding in parallel a first and second outer sheath around a first and second core, respectively, so as to provide two separate cable elements having respective longitudinal axes laying in a first plane. While the outer sheaths are in a softened state, the cable elements are passed in parallel through a twisting die which causes their longitudinal axes to lay in a second plane forming a predetermined twisting angle with respect to the first plane. This twisting causes the outer sheaths to join together, thereby forming a figure of eight cable.

10 Claims, 5 Drawing Sheets

(51) Int. Cl.
*B29C 48/154* (2019.01)
*B29C 48/05* (2019.01)
*H01B 13/24* (2006.01)
*B29C 48/00* (2019.01)
*B29D 11/00* (2006.01)
*B29C 48/21* (2019.01)
*G02B 6/44* (2006.01)
*B29C 48/19* (2019.01)
*H01B 13/00* (2006.01)
*B29K 23/00* (2006.01)
*B29K 77/00* (2006.01)
*B29K 667/00* (2006.01)
*B29K 705/10* (2006.01)
*B29K 705/12* (2006.01)
*B29L 11/00* (2006.01)
*B29L 31/34* (2006.01)

(52) U.S. Cl.
CPC .......... *B29C 48/156* (2019.02); *B29C 48/19* (2019.02); *B29C 48/21* (2019.02); *B29C 48/92* (2019.02); *B29D 11/00663* (2013.01); *G02B 6/449* (2013.01); *G02B 6/4422* (2013.01); *G02B 6/4486* (2013.01); *H01B 13/0003* (2013.01); *H01B 13/0036* (2013.01); *H01B 13/24* (2013.01); *B29C 48/0013* (2019.02); *B29K 2023/065* (2013.01); *B29K 2023/0633* (2013.01); *B29K 2077/00* (2013.01); *B29K 2667/006* (2013.01); *B29K 2705/10* (2013.01); *B29K 2705/12* (2013.01); *B29L 2011/0075* (2013.01); *B29L 2031/3462* (2013.01)

(58) Field of Classification Search
CPC ....... B29C 48/156; B29C 48/21; B29C 48/92; B29D 11/00663; G02B 6/4422; G02B 6/4486; G02B 6/449; G02B 6/4491; H01B 13/0003; H01B 13/0036; H01B 13/24; B29L 2011/0075; B29L 2031/3462
See application file for complete search history.

(56) References Cited

U.S. PATENT DOCUMENTS 5,268,971 A * 12/1993 Nilsson ................ G02B 6/4407
385/101
6,054,070 A 4/2000 Tokairn et al.

FOREIGN PATENT DOCUMENTS

| FR | 2393503 A1 | 12/1978 |
| GB | 821303 A | 10/1959 |
| GB | 2169094 A | 7/1986 |
| GB | 2215080 A | 9/1989 |
| JP | 9-322353 | * 12/1997 |

OTHER PUBLICATIONS

Machine translation of JP 9-322353 published Dec. 12, 1997 (Year: 1997).*
International Search Report and Written Opinion of corresponding International Application No. PCT/EP2016/071671 dated Jun. 16, 2017; 11 pages.
PCT; International Preliminary Report on Patentability for PCT/EP2016/071671; dated Mar. 19, 2019; 7 pages.

* cited by examiner

PROCESS AND APPARATUS FOR THE MANUFACTURING OF A FIGURE-OF-EIGHT CABLE

CROSS-REFERENCE TO RELATED APPLICATION

This application claims priority to International Application No. PCT/EP2016/071671 filed Sep. 14, 2016, the contents of which is hereby incorporated in the entirety.

TECHNICAL FIELD AND BACKGROUND OF THE INVENTION

The present invention relates to the field of figure-of-eight cables. In particular, the present invention relates to a process and an apparatus for manufacturing a figure-of-eight cable for aerial installation.

Known telecommunication cables for aerial installation comprise electrical and/or optical conductors and are designed to be suspended in catenary through poles in order to connect customers' premises. These types of cables are generally called "drop cables".

Historically, data transmission was provided by drop cables with insulated electrical conductors typically arranged in pair or quads. Then, electrical conductors have been replaced by optical fibers which support data transmission at much higher rates.

Drop cables may comprise both electrical conductors and optical conductors. In such drop cables, the optical conductors are dedicated to data transmission and electrical conductors may also provide an electrical supply which may be used in emergency situations, e.g. when the mains electrical supply to the customer's premises has been interrupted.

A drop cable for aerial installation typically comprises a strength member to support the optical and/or electrical conductors as the cable is suspended in catenary. The strength member(s) may be embedded within the thickness of the cable sheath. This arrangement however makes mid-span access to optical and/or electrical conductors of the cable difficult, since it requires the strength member(s) to be cut through.

A known technique for easing mid-span access to optical and/or electrical conductors is making use of a "figure-of-eight" cable construction. A "figure-of-eight" cable is formed by two parallel, transversally joined cable elements with circular cross sections, so that the cable cross section is in the shape of an "8". One cable element may house the optical and/or electrical conductors of the cable, while the other cable element may house the strength member(s) supporting the cable. The "figure-of-eight" cable construction also results in a cable with reduced size in comparison to cables with strength members embedded within the sheath thickness.

Alternatively, a "figure-of-eight" cable may be formed by one cable element housing the electrical conductors, while the other cable element houses the optical conductors and the strength member(s) supporting the cable.

Processes for manufacturing an electrical and/or optical cable typically comprise extruding a sheath around optical and/or electrical conductors. The extrusion is typically carried out by an extrusion head comprising a core tube through which the conductors are fed and a die with a hole through which the sheath material flows. Different extrusion techniques are known, depending on the relative position between core tube and die.

A first extrusion technique, sometimes called "tubing", provides for positioning the core tube end flush with the die, so that the sheath compound flows out through an annular channel formed between the die and the core tube in a shape which is larger than that required for the final product. Thereafter, the extruded compound is stretched and radially compressed to reach its final shape. Substantially no pressure is exerted by the extruded sheath compound on the conductors during extrusion.

A second extrusion technique, sometimes called "fill solid", provides for positioning the core tube end behind the die, so that the sheath compound flows out through the annular channel formed between the die and the core tube and then through the space between the conductors and the die. The sheath is formed with a size which depends on the size of the die hole. The sheath material is extruded into the interstitial spaces of the conductors, and the extrusion pressure is exerted thereon (100-400 bar).

A third extrusion technique, sometimes called "semi-compression", provides for positioning the core tube end behind the die but very close thereto, so that the sheath compound flows out throw the annular channel formed between the die orifice and the core tube. The sheath is formed at the extrusion head with a size which depends on the distance between core tube and die. Since the sheath material flow is restricted by the space between core tube and die, the pressure exerted onto the conductors is limited.

U.S. Pat. No. 6,054,070 describes a method of manufacturing a self-support optical cable with a "figure-of-eight" construction. According to the method, a support wire and an optical cable body are fed into an extruder which collectively coats them with a coating material to form a common sheath formed into an eight figure shape. After being extruded, the cable is cooled while it passes through a plurality of guide wheels, so that an excess length is given to the optical cable body. The guide wheels are disposed alternatively in the feed-out direction.

SUMMARY OF THE INVENTION

The Applicant has noticed that the known processes and apparatuses for the manufacturing of figure of eight cables described above exhibit some drawbacks.

The Applicant has noticed that, by using the above mentioned known fill solid technique with a suitably shaped die (which provides a sheath with its final eight figure shape directly at the extrusion head), some problems arise.

First of all, the cable sheath exhibits some undesired deformations during manufacturing. The web connecting the two cable elements of the figure-of-eight may get deformed during the manufacturing process, because it may not be structurally strong enough to support the weight of the two cable elements when the cable is freely suspended, e.g. between the extrusion head and the cooling trough. Besides, the sheath material flowing between the core tube and the die may push the conductors of the cable elements laterally or downwards, resulting in nonconcentric sheath for one or both cable elements.

Moreover, providing a sheath with a figure-of-eight shape directly at the extrusion head is often disadvantageous, in that all the cable elements of the same cable are necessarily extruded with a same extrusion technique (e.g. fill solid). Hence, it is not possible choosing the most suitable extrusion technique for each cable element.

In view of the above, the Applicant has tackled the problem of providing a process and an apparatus for manufacturing a figure-of-eight cable wherein the most appropriate technique may be used for the formation of each cable element and wherein deformations of the web and of the sheaths of the cable elements are minimized.

The Applicant has found a process for manufacturing a figure of eight cable wherein at least two transmission cores (electrical cores and/or optical cores) are fed and a coaxial sheath is separately extruded around each transmission core, so that two separate, unjoined cable elements are formed. Then, before the sheath material hardens, the cable elements are twisted together so that they reciprocally join to form a "figure-of-eight" cable. The cable is finally cooled. In particular, by twisting the cable elements together before their sheath materials start to cool and harden, part of the sheath extruded around one core merges with part of the sheath extruded around the other core, thereby causing the cohesion of the two sheath materials forming the desired "figure-of-eight" drop cable.

In one aspect, the present invention provides a process for the manufacturing of a figure-of-eight cable, the process comprising:

a) extruding a first outer sheath around a first core so as to provide a first cable element having a first longitudinal axis and a second outer sheath around a second core so as to provide a second cable element having a second longitudinal axis, the first longitudinal axis and the second longitudinal axis laying in a first plane at an extrusion head; and b) while at least one of the first outer sheath and the second outer sheath is in a softened state, passing the first cable element and the second cable element in parallel through a twisting die, the twisting die causing the first longitudinal axis and the second longitudinal axis to lay in a second plane forming a predetermined twisting angle with respect to the first plane, whereby the first outer sheath and the second outer sheath are caused to join together.

Preferably, the step b) is performed at least partially while the first outer sheath and the second outer sheath are both in a softened state.

Preferably, the extrusion head has separate extrusion dies with axes laying parallel in the first plane.

Preferably, the twisting die has a common aperture housing the first cable element and the second cable element with the first longitudinal axis and the second longitudinal axis laying parallel in the second plane.

Preferably, the process comprises the step of adjusting the twisting angle between the first plane and the second plane between 0° and 360°.

Preferably, the first core is an electrical core, comprising at least a telecommunication pair, and the second core is an optical core, comprising at least an optical fiber.

Preferably, the process comprises the step of feeding the electrical core, the optical core and at least one strength member to the extrusion head.

Preferably, the process comprises the step of adjusting the distance between the extrusion head and the twisting die.

Preferably, the step of adjusting the distance between the extrusion head and the twisting die and the step of adjusting the twisting angle between the first plane and the second plane are interrelated.

Preferably, the first cable element and the second cable element are caused to cool to a solid state after having been advanced in parallel through the twisting die.

In a further aspect, the invention relates to an apparatus for the manufacturing of a figure-of-eight cable, the apparatus comprising: an extrusion head having separate extrusion dies for extruding in parallel a first outer sheath over a first core so as to provide a first cable element having a first longitudinal axis and a second outer sheath over a second core so as to provide a second cable element having a second longitudinal axis, causing the first longitudinal axis and the second longitudinal axis to lay in a first plane; a twisting die for advancing in parallel the first and second cable elements, causing the first longitudinal axis and the second longitudinal axis to lay in a second plane; wherein the second plane forms a predetermined twisting angle with respect to the first plane.

Preferably, the twisting die is rotatably adjustable, so as to select the predetermined twisting angle.

Preferably, the twisting die is housed within a cooling trough at a predetermined distance from the extrusion head.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF THE INVENTION

Herein after, an apparatus 7 for manufacturing a cable with a "figure-of-eight" construction according to embodiments of the present invention will be described.

Figure 1:
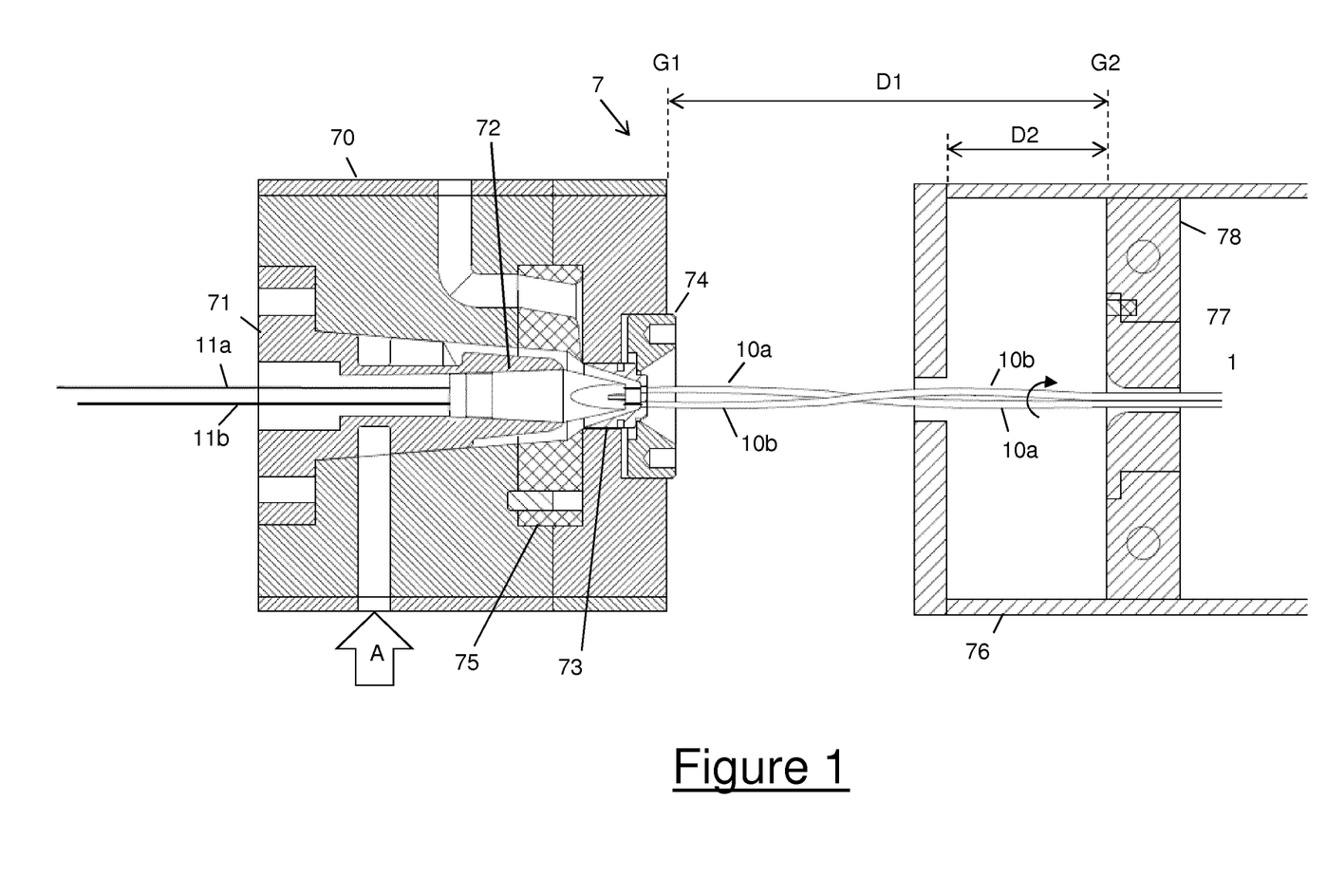
FIG. 1 is a section view of an apparatus for manufacturing an electrical and optical cable according to an embodiment of the present invention.

As shown in FIG. 1, the apparatus 7 comprises an extrusion head 70. The extrusion head 70 comprises a cartridge 71, a core tube 72 and a die 73 supported by a die nut 74. The apparatus 7 further comprises a cooling trough 76.

The apparatus 7 also comprises a twisting die 77 rotatably supported by a die holder 78. The distance D1 between the extrusion head 70 and the twisting die 77 is preferably comprised between 400 mm and 1500 mm, more preferably between 700 mm and 900 mm, even more preferably is substantially equal to 800 mm. The distance D1 is preferably adjustable, as it will be described herein after.

The twisting die 77 is preferably located within the cooling trough 76, as schematically depicted in FIG. 1. This way, at least part of the twisting step occurs while the cable elements are cooled in the trough 76, as it will be described in detail herein after. The twisting die 77 is preferably located at a distance D2 from the entry of the cooling through 76. The distance D2 is preferably comprised between 300 mm and 450 mm, more preferably between 350 mm and 400 mm. Also the distance D2 is preferably adjustable.

According to an embodiment not shown in the drawings, the twisting die 77 may be located between the extrusion head 70 and the cooling through 76. This way, the twisting step is entirely performed before the cooling of the cable elements in the cooling trough 76 begins.

The apparatus 7 may comprise other optional tools, such as vacuum troughs, embossing wheels, etc., which for simplicity are not shown in FIG. 7.

Figure 2A:
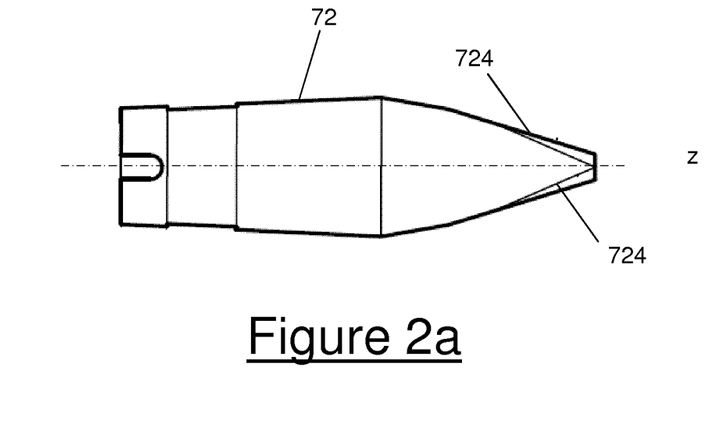
FIGS. 2a, 2b and 2c are two side views and a front view of a core tube according to an embodiment of the present invention.
Figure 2B:
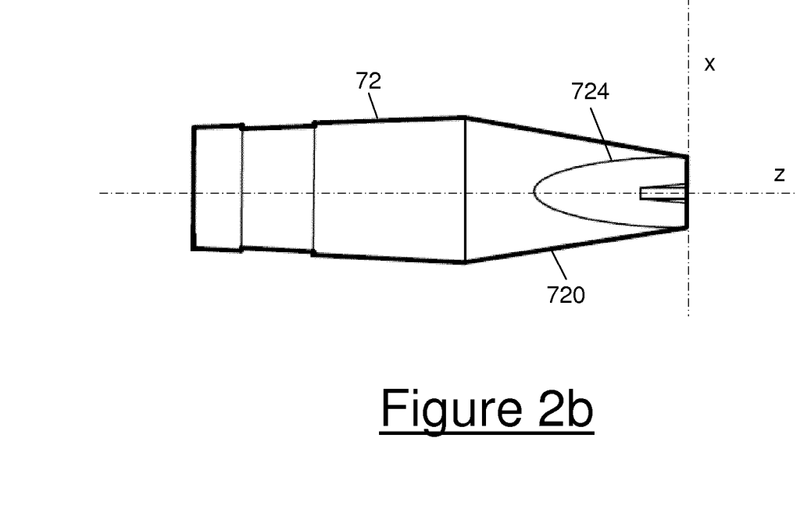
Figure 2C:
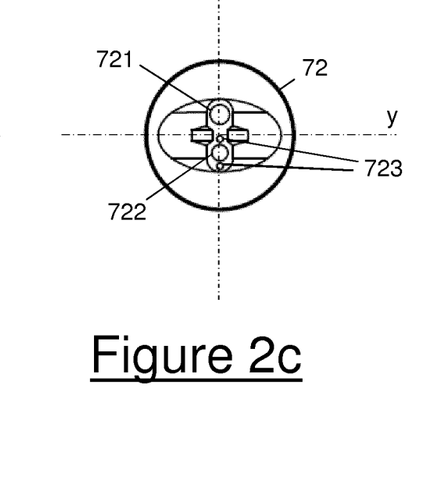

FIGS. 2a, 2b and 2c show in further detail the core tube 72 comprised in the apparatus 7, according to an embodiment of the present invention.

The core tube 72 preferably has a hollow body extending along an axis z (also termed herein after "feeding direction") and having a tapered end 720. The tapered end 720 is provided with a number of holes configured to allow the passage of electrical and optical cores, strength members and, if present, ripcords, as required by the design of the cable to be manufactured.

In particular, the core tube 72 preferably comprises a first hole 721 configured to allow the passage of a first transmission core, a second hole 722 configured to allow the passage of a second transmission core and possibly one or two smaller holes 723 configured to allow the passage of one or two strength members.

The holes 721 and 722 preferably extend along the feeding direction z and are disposed parallel to each other.

The hole(s) 723 are preferably located close to the hole 722 and are substantially aligned with the holes 721 and 722 along an axis x substantially perpendicular to the feeding direction z.

The arrangement of the holes 721, 722 and the holes 723 at the tapered end 720 of the core tube 72 substantially corresponds to the arrangement of an electrical core, an optical core and strength members in the cable to be obtained. Hence, at the extrusion head 70 the cable will have a major plane of symmetry X containing the axis x and the feeding direction z.

The core tube 72 is shaped so as to cause the flowing of the sheath material in the direction of the axis x (namely, of the major axis of symmetry X of the cable). In particular, the tapered end 720 of the core tube 72 is shaped so as to provide a couple of slanted, flat surfaces 724 which converge in the plane perpendicular to the axis x.

Figure 3A:
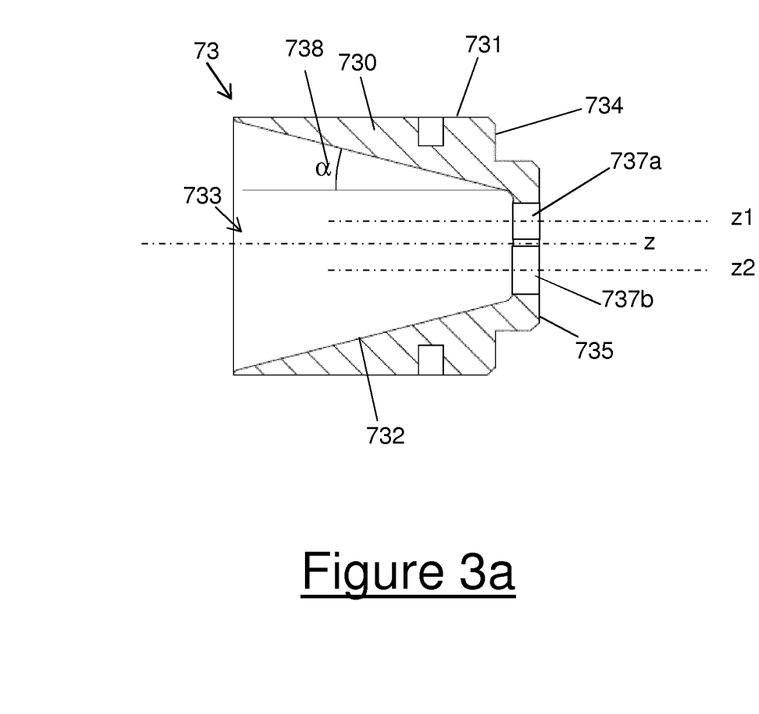
FIGS. 3a and 3b are a section view and a front view of a die according to an embodiment of the present invention.
Figure 3B:
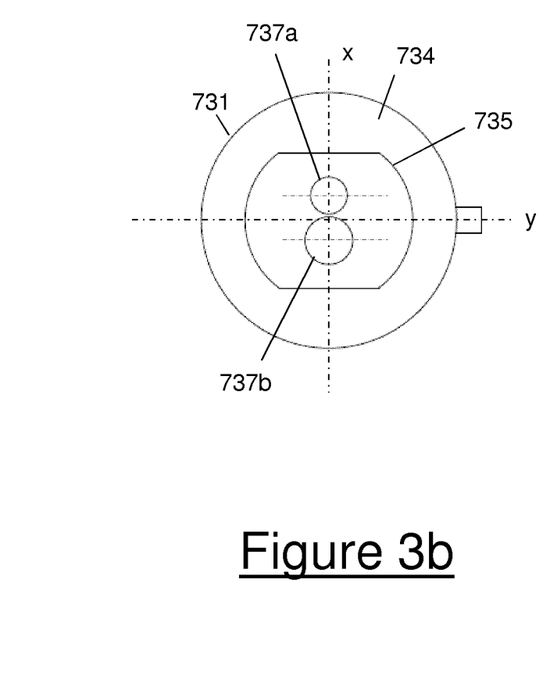

FIGS. 3a and 3b show in further detail the die 73 comprised in the apparatus 7.

The die 73 comprises a circumferentially closed side wall 730 having an axis of rotational symmetry parallel to the feeding direction z. The side wall 730 has an outer cylindrical surface 731 and an inner truncated cone shaped surface 732. The truncated cone shaped surface 732 forms an angle α with the feeding direction z. The angle α is preferably comprised between 20° and 40°, more preferably between 25° and 35°.

A first end of the die 73 has a substantially circular opening 733 configured to receive the core tube 72. The second, opposite end of the die 73 is closed by a substantially circular closing plate 734. The closing plate 734 has an embossed central portion 735.

The embossed central portion 735 of the closing plate 734 exhibits two separate extrusion dies 737a, 737b. Each extrusion die is configured to extrude the outer sheath of a respective cable element of a cable having a "figure-of-eight" construction. The extrusion dies 737a, 737b are aligned along the axis x. The distance between the two extrusion dies 737a, 737b is preferably 0.1 mm to 0.5 mm.

Each extrusion die 737a, 737b extends along a respective axis $z_1$, $z_2$, parallel to the feeding direction z.

The die 73 also preferably comprises, on its outer surface 731, an annular recess 738 configured to receive fixing means for fixing the die 73 to the die nut 74.

Referring again to FIG. 1, in the extrusion head 70 the tapered end 720 of the core tube 72 is received in the die 73 through the opening 733. The holes of the tapered end 720 are preferably substantially aligned with the extrusion dies on the closing plate 734 of the die 73 along the feeding direction z. In particular, the hole 721 of the core tube 72 is substantially aligned with the extrusion die 737a of the die 73 along the feeding direction z, while the holes 722, 723 are substantially aligned with the extrusion die 737b along the feeding direction z.

According to a preferred embodiment, the tapered end 720 of the core tube 72 is kept far enough from the closing plate 734 of the die 73, so as to implement a filled solid extrusion technique for both the sheaths to be extruded though the extrusion dies 737a and 737b. In particular, the distance between the tapered end 720 of the core tube 72 and the inner surface of the closing plate 734 of the die 73 is preferably comprised between 1.5 mm and 3.5 mm.

Figure 4A:
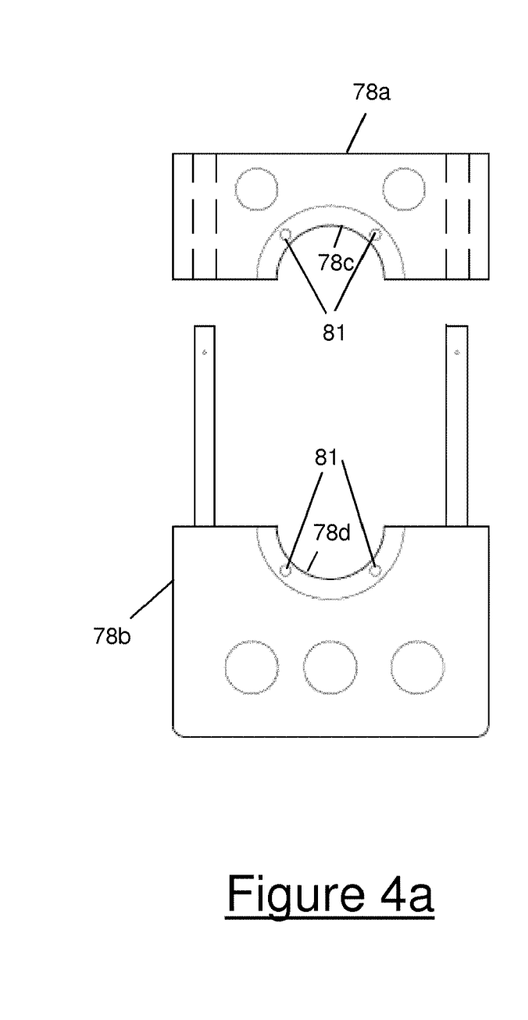
FIGS. 4a, 4b, and 4c are front views of a die holder and a twisting die according to the present invention.
Figure 4B:
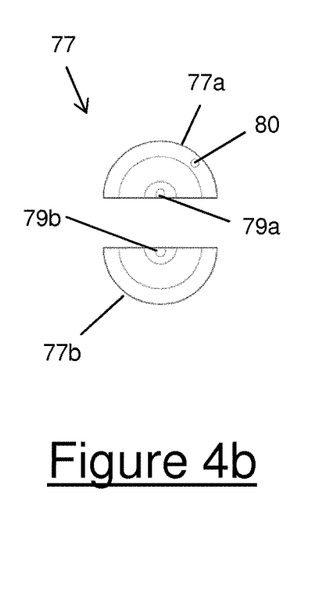
Figure 4C:
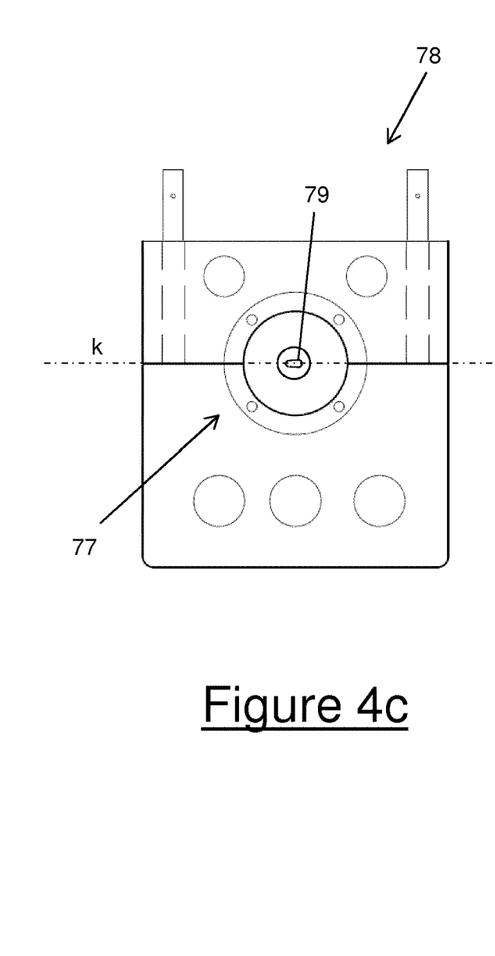

FIGS. 4a, 4b and 4c show in further detail the twisting die 77 and the die holder 78.

The twisting die 77 is splittable into two parts 77a, 77b so it can be assembled around the cable to be manufactured after it has passed through the extrusion head 70 at the start of the process. For the same reason, the die holder 78 too is splittable into two parts 78a, 78b.

Each part 77a, 77b of the twisting die 77 is preferably semi-circular and comprises a respective half-hole 79b, 79a. The half-holes 79a, 79b are configured to form, when the parts 77a, 77b of the twisting holder 77 are joined together, an aperture 79 elongated along an axis k which is suitable for receiving the cable elements of a "figure-of-eight" cable in such a way that the cable is free to move in the feeding direction z.

Further, each part 78a, 78b of the die holder 78 preferably comprises a respective semi-circular recess 78c, 78d suitable for rotatably receiving a respective part 77a, 77b of the twisting die 77. This way, the twisting die 77 may be rotatably supported by the die holder 78.

The twisting die 77 also preferably comprises a pin 80, while the die holder 78 comprises a number of holes 81 configured to receive the pin 80. The holes 81 are preferably evenly distributed on a circumference concentric with the twisting die 77. If N is the number of holes 81, the angular distance between two holes 81 is θ=360/N. The angle θ will be termed herein after "twisting rate". The number N is preferably equal to or higher than 2. For instance, N may be equal to 4, as depicted in FIGS. 4a and 4c, providing a twisting rate θ=90°. According to another example, N may be equal to 8, which would result in a twisting rate θ=45°.

Figure 5:
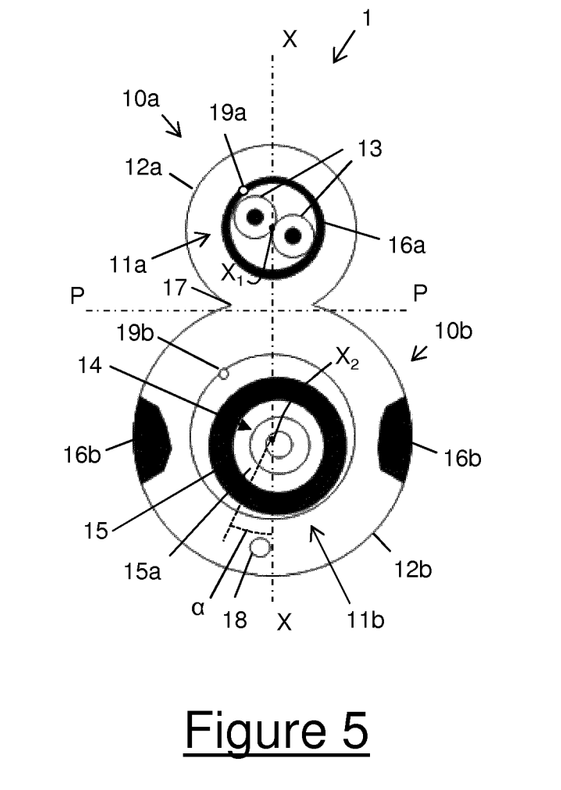
FIG. 5 schematically shows an embodiment of a figure of eight cable manufactured according to the present invention.

In order to manufacture a cable with a "figure-of-eight" construction, such as for instance a cable similar to the cable 1 shown in FIG. 5, two transmission cores 11a and 11b and a strength member 18 (not shown in FIGS. 1 to 4) are guided into the extrusion head 70, in particular through the holes 721, 722 (one for each transmission core) and a hole 723 (for the strength member) of the core tube 72.

A sheath material is fed to the extrusion head 70, as indicated by the arrow A in FIG. 1, and flows about the cartridge 71 and within the die 73 about the core tube 72. The sheath material is then extruded through the extrusion dies 737a, 737b of the die 73 to form two separate outer sheaths 12a, 12b, one surrounding the transmission core 11a so as to form a cable element 10a, and the other surrounding the transmission core 11b and embedding the strength member 18 so as to form a cable element 10b. The first cable element 10a and the second cable element 10b pass parallel through the extrusion dies 737a, 737b, causing their axes $X_1$, $X_2$ to coincide with the axes $z_1$, $z_2$ of the extrusion dies 737a, 737b and hence to lay in a first plane comprising the axis x along which the holes 737a, 737b are aligned and the feeding direction z. In other words, the cable elements 10a, 10b are aligned along the axis x.

In case the extrusion technique is fill solid, as in the present example, the shape and size of the outer sheaths 12a, 12b basically depend on the shape and size of the extrusion dies 737a, 737b. The extrusion speed is preferably comprised between 1 and 70 m/min.

The cable elements 10a, 10b are then fed to the cooling trough 76, where their outer sheaths 12a, 12b start hardening.

At the start of the extrusion process, the cable elements 10a, 10b are housed in the half-hole 79b of the lower part 77b of the twisting holder 77, which is mounted in the lower part 78b of the die holder 78. Subsequently, the upper part 77a of the twisting die 77 is mounted over the lower part 77b, so that the cable elements 10a, 10b are enclosed by the two half holes 79a, 79b and free to move longitudinally along the feeding direction z. The twisting die 77 is then rotated in the die holder 78, until the major axis k of the elongated hole aperture 79 formed by the two half holes 79a, 79b forms a desired twisting angle with the axis x along which the cable elements 10a, 10b are aligned at the extrusion head 70. Accordingly, the first cable element 10a and the second cable element 10b pass parallel through the elongated aperture 79 causing their axes $X_1$, $X_2$ to lay in a second plane forming the selected twisting angle with respect to the first plane. The twisting die 77 is then fixed at the selected twisting angle by inserting a pin 80 in one of the holes 81 provided on the die holder 78. The twisting angle may be regulated from 0° to 360° with a pitch equal to the twisting rate θ, namely to the angular distance between the holes 81. For instance, the twisting die 77 may be rotated by a twisting angle of 180°, as schematically depicted in FIG. 1.

As the cable elements 10a, 10b run from the extrusion head 70 to the twisting die 77, the twisting angle between the axis x of the extrusion head 70 and the axis k of the aperture 79 of the twisting die 77 causes the cable elements 10a, 10b to twist together. As the cable elements 10a, 10b are twisted, the sheath material of their outer sheaths 12a, 12b partially merges and forms a web 67 that longitudinally joins the cable elements 10a, 10b for their whole length so as to form a "figure-of-eight" cable 1, which is shown in FIG. 5.

This way, the extent of bonding between the cable elements 10a, 10b may be easily controlled. Indeed, the extent of the bonding depends on the shape and thickness of the web 17, which in turn depends on the amount of twist between the cable elements 10a, 10b.

The amount of twist can be controlled by adjusting the cable extrusion parameters (such as the extrusion speed), the twisting angle (namely, the angular position of the twisting die 77) and the distance D1 between extrusion head 70 and twisting die 77. The extrusion speed is preferably comprised between 1 and 70 m/min. The Applicant has made some tests and verified that, given a certain distance D1 between extrusion head 70 and twisting die 77, the higher the amount of twist between the cable elements 10a, 10b from the extrusion head 70 to the twisting die 77 (namely, the higher the twisting angle), the thicker the web 17 (and hence the higher the bonding between the cable elements) in the final product. Besides, given a certain twisting angle, the higher the distance D1, the tighter the bonding between the cable elements 10a, 10b.

Therefore, for a given apparatus construction, the extent of bonding between the cable elements 10a, 10b can be ultimately controlled by adjusting the extrusion rate and/or the twisting angle (namely, the angular position of the twisting die 77) and/or the distance D1. In particular, the adjustment of D1 and the adjustment of the twisting angle are interrelated, as described above. This advantageously allows controlling the extent of bonding between the cable elements 10a, 10b so that, for example, it may be easily split without using ripcords in the web 17.

Furthermore, since each cable element is separately extruded, different extruding techniques may be used for different cable elements. This may be done, for instance, by suitably designing the core tube and the die so that a first cable element is obtained by fill solid technique (i.e. a cable element comprising strength members embedded in the thickness of the outer sheath and an optical core tightly embedded in the outer sheath), and a second cable element is obtained by semi-compression technique (i.e. a cable element comprising a transmission core loosely or partially loosely arranged in the outer sheath).

The Applicant has made some tests by manufacturing a cable similar to that of FIG. 5 using an apparatus of the type of the apparatus 7. The electrical core 11a was made of a copper twisted pair, loaded with a tension of 66 g. The optical core 11b was a single fiber optical cable with an outer diameter of 2.5 mm, loaded with a tension of 1250 g. The strength member 18 was a wire strength member loaded with a tension of 600 g and pre-heated at 360° C. Two ripcords 19a, 19b were also provided, which were made of polyester yarn and were provided with a back tension of 400 g. The sheath material was Borealis Borstar LE8707, and was extruded into two separate outer sheaths 12a, 12b by a core tube and die similar to core tube 72 and die 73 described above using a fill solid technique, so as to provide two separate cable elements 10a, 10b. The cable elements 10a, 10b then entered a cooling trough. The cooling trough was 35 m long and the water temperature was 12° C. The cooling trough was located at a distance of 40 cm from the extrusion head. The extrusion temperature was comprised between 160° C. and 190° C. During the tests, the resulting material pressure inside the extrusion head 70 was in the region of 120 bar when a 60 mm diameter extruder was operating at 40 revolutions per minute.

Within the cooling trough, a twisting die was located through which the two cable elements 10a, 10b were passed in parallel. The twisting die was located at a distance of about 35 cm from the entry of the cooling trough. The twisting die was rotated by a twisting angle of 180° relative to the extrusion head, so as to twist the cable elements 10a, 10b. The twisting resulted in a partial merge of the sheath material (which was still in a softened state) of the outer sheaths 12a, 12b so as to form the web 17, that longitudinally joined the cable elements 10a, 10b for their whole length so as to form the "figure-of-eight" cable 1.

At the end of the cooling trough, other apparatus were provided to complete the process, such as a cable drier, a diameter gauge, a spark test, a caterpillar and a drum take-up.

The Applicant has verified that, in the resulting cable, the shape and thickness of the web allowed easily splitting the cable elements without using any ripcord embedded within the web. Further, the outer sheaths were substantially concentric with the respective electrical and optical cores, while the web was satisfactorily constant in size.

FIG. 5 schematically shows an embodiment of a figure of eight cable 1 made with the process according to the present invention.

The figure of eight cable 1 comprises two cable elements 10a and 10b. Each cable element 10a, 10b comprises a transmission core 11a, 11b and an annular outer sheath 12a, 12b enclosing the transmission core 11a, 11b. The cable 1 also comprises a web 17 longitudinally joining the outer sheaths 12a, 12b so as to provide the cable 1 with major plane of symmetry X, which at the extrusion head corresponds to the plane comprising the axis x of the extrusion die and the feeding direction z. The outer sheaths 12a, 12b and web 17 are preferably made of a polymeric material, e.g. PE (polyethylene), PA (polyamide), HDPE (High Density Polyethilene) or LDPE (Low Density Polyethylene).

According to this example, the transmission core 11a of the cable element 10a is an electrical core comprising a number of insulated conductors 13, e.g. two stranded copper wires. The conductors 13 may be used for telecommunication or power purposes or both. For example, a conductor 13 can be used for telecommunication purpose and another conductor 13 can be used for power purpose.

The transmission core 11b of the cable element 10b preferably is an optical core comprising a single optical fiber 14 tightly buffered in a tube 15. The tube 15 preferably comprises an LSOH (Low Smoke Zero Halogen) material and is preferably filled with aramid yarns 15a. The tube 15 with the optical fiber 14 tightly buffered therein is loosely housed within the outer sheath 12b. The tube 15 is preferably made of a polymeric material, e.g. PBT (polybutylene terephthalate).

The outer sheath 12a housing the electrical core 11a preferably has an outer diameter shorter than the outer diameter of the outer sheath 12b housing the optical core 11b.

The cable 1 comprises at least one strength member. Preferably, all the strength members of the cable 1 are substantially located in the major plane of symmetry X. In the present description and in the claims, the expression "substantially located" or "substantially aligned" means that the angular distance α between the major plane of symmetry X of the cable 1 and a plane containing both the axis of the strength member and the longitudinal axis $X_1$ or $X_2$ of the cable element 10a or 10b comprising the strength member is lower than 45°, preferably lower than 20°, more preferably lower than 10°, even more preferably lower than 5°.

According to the example shown in FIG. 5, the cable 1 preferably comprises a single strength member 18 substantially located on the major plane of symmetry X of the cable. The strength member 18 is preferably embedded within the thickness of the outer sheath 12b of the cable element 10b, close to the plane of symmetry X, at a position substantially diametrically opposed to that of the web 17. This arrangement of the strength member 18 advantageously eases the cable stripping.

The strength member 18 may be metallic. For instance, the strength member 18 may comprise three stranded wires of brass clad steel. In this case, the strength member 18 may optionally comprise additional copper wires for telecommunication or power purposes. Alternatively, the strength member may be non-metallic, e.g. it may be an aramid strength member or it may comprise CNT (carbon nanotubes) or graphene.

Optionally, the outer sheath 12b of the cable element 10b is made of a first material and preferably comprises two portions 16b made of a second different material. The portions 16b are preferably accessible from outside the cable 1 and are preferably arranged at diametrically opposed positions, on a plane substantially perpendicular to the major plane of symmetry X.

Preferably, the first material has a higher fracture toughness than the second material, in order to ease removal of the outer sheath 12b. The first and second materials are preferably compatible from the mechanical point of view in particular, they exhibit substantially the same hardness and properties of reciprocal adhesion. In particular, the first and second materials are preferably different mixtures comprising a same compound, e.g. polyethylene. In addition to such compound, the first material comprises a further compound increasing its fracture resistance, e.g. polypropylene. This provides the outer sheath 12b with mechanical stability. Preferably, the first and second materials have different colors, in order to allow visual identification of the portions 16b.

Further, the cable 1 may optionally comprise two ripcords 19a, 19b. Each ripcord 19a, 19b is preferably embedded in the thickness of the outer sheath 12a, 12b, next to the inner surface thereof.

Since the strength member 18 is substantially located on the major plane of symmetry X, it is substantially aligned with the transmission cores 11a, 11b of the cable 1. Hence, advantageously, the cable 1 exhibits a single preferential bending plane, which is the plane P perpendicular to the major plane of symmetry X. The cable 1 is therefore advantageously very stable when it is bent or wound on a drum.

According to embodiments not shown in the drawings, the strength members may be embedded in the thickness of the outer sheath having the shorter outer diameter, which in most cases houses the electrical core.

Further, the cable 1 may comprise one or two strength members. For instance, four strength members may be envisaged, namely two per each cable element of the cable, provided they are all substantially located on the major symmetry of plane of the cable housed within a cooling trough (76) at a predetermined distance (D1) from the extrusion head (70).

The invention claimed is:

1. A process for manufacturing a figure-of-eight cable, said process comprising:
    a) extruding a first outer sheath around a first core so as to provide a first cable element having a first longitudinal axis and a second outer sheath around a second core so as to provide a second cable element having a second longitudinal axis, said first longitudinal axis and said second longitudinal axis laying in a first plane at an extrusion head; and
    b) while at least one of the first outer sheath and the second outer sheath is in a softened state, passing said first cable element and said second cable element in parallel through a twisting die, said twisting die causing said first longitudinal axis and said second longitudinal axis to lay in a second plane forming a predetermined twisting angle with respect to the first plane, whereby the first outer sheath and the second outer sheath are caused to join together;
    wherein said twisting die has a common aperture housing the first cable element and the second cable element with said first longitudinal axis and said second longitudinal axis laying parallel in the second plane.

2. The process according to claim 1, wherein step b) is performed at least partially while said first outer sheath and said second outer sheath are both in a softened state.

3. The process according to claim 1, wherein said extrusion head has separate extrusion dies with axes laying parallel in the first plane.

4. The process according to claim 1, comprising adjusting the twisting angle between the first plane and the second plane between 0° and 360°.

5. The process according to claim 4, wherein a step of adjusting the distance between said extrusion head and said twisting die and the step of adjusting the twisting angle between the first plane and the second plane are interrelated to determine an extent of bonding between the first and second cable elements.

6. The process according to claim 1, wherein said first core is an electrical core comprising at least a telecommunication pair, and said second core is an optical core comprising at least an optical fiber.

7. The process according to claim 6, further comprising a step of feeding said electrical core, said optical core and at least one strength member to said extrusion head.

8. The process according to claim 1, comprising a step of adjusting a distance between said extrusion head and said twisting die.

9. The process according to claim 1, wherein said first cable element and said second cable element are caused to cool to a solid state after having been advanced in parallel through said twisting die.

10. A process for manufacturing a figure-of-eight cable, said process comprising:
   extruding a first outer sheath around a first core so as to provide a first cable element having a first longitudinal axis and a second outer sheath around a second core so as to provide a second cable element having a second longitudinal axis, said first longitudinal axis and said second longitudinal axis laying in a first plane at an extrusion head;
   while at least one of the first outer sheath and the second outer sheath is in a softened state, passing said first cable element and said second cable element in parallel through a twisting die, said twisting die causing said first longitudinal axis and said second longitudinal axis to lay in a second plane forming a predetermined twisting angle with respect to the first plane, whereby the first outer sheath and the second outer sheath are caused to join together; and
   adjusting a distance between said extrusion head and said twisting die.

\* \* \* \* \*